United States Patent
Liu et al.

(10) Patent No.: US 7,118,028 B2
(45) Date of Patent: *Oct. 10, 2006

(54) METHOD AND MACHINE FOR CUTTING WINDOW BLIND

(75) Inventors: Kuei-Lu Liu, Hsinchu (TW); Jung-Kuei Lin, Hsinchu (TW)

(73) Assignees: Nien Made Enterprise Co., Ltd., (TW); Industrial Technology Research Institute, (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,609

(22) Filed: Jul. 8, 2004

(65) Prior Publication Data

US 2005/0184143 A1    Aug. 25, 2005

(30) Foreign Application Priority Data

Feb. 24, 2004  (TW) ............................... 93104687 A

(51) Int. Cl.
*G06F 17/00*   (2006.01)
(52) U.S. Cl. .................................................. 235/375
(58) Field of Classification Search ............... 235/375, 235/376, 462.01, 475, 482, 483; 83/13, 694
See application file for complete search history.

(56) References Cited

U.S. PATENT DOCUMENTS

| | | | | |
|---|---|---|---|---|
| 4,159,417 A | * | 6/1979 | Rubincam | 235/375 |
| 2003/0072629 A1 | * | 4/2003 | Mueller | 409/134 |
| 2004/0103767 A1 | * | 6/2004 | Lin et al. | 83/13 |
| 2004/0173079 A1 | * | 9/2004 | Caputo et al. | 83/694 |
| 2004/0254835 A1 | * | 12/2004 | Thomas et al. | 705/14 |

* cited by examiner

*Primary Examiner*—Thien M. Le
*Assistant Examiner*—Thien T. Mai
(74) *Attorney, Agent, or Firm*—Bacon & Thomas PLLC

(57) ABSTRACT

A method for cutting a window blind by using a cutting machine includes the step of (a) displaying data of the window blind on a display by reading a barcode provided at the window blind; (b) inputting the size of a window that is to be installed with the window blind and an installation mode of the window blind by selection, and then calculating and displaying on the display a size to be cut based on the data of the window blind and the size of the window and the installation mode selected; and (c) automatically controlling a positioning mechanism of the cutting machine to move to a predetermined position corresponding to the calculated size to be cut by a processor for stopping the window blind in a cutting position, and then controlling a cutting unit of the cutting machine to cut the window blind by the processor.

32 Claims, 5 Drawing Sheets

| | Definition | Kind code |
|---|---|---|
| Product Type | 2" Grandwood | 1 |
| | 2" Premier | 2 |
| | Cellular Shades | 3 |
| | Pleated Shades | 4 |
| | 1" Metal Plus | 5 |
| | 1" Aluminum | 6 |
| | 3 1/2" Grandwood Vertical | 7 |
| | 2. 5" Premier | 8 |
| | | 9 |
| Width | 18"-73" | 18-73 |
| Shading Length | 40"-99" | 40-99 |
| Color | White | 1 |
| | Soft White | 2 |
| | Alabaster | 3 |
| | Golden Oak | 4 |
| | Vanilla | 5 |
| | Henter Green | 6 |
| | Natural | 7 |

|  | Definition | Kind code |
|---|---|---|
| Product Type | 2" Grandwood | 1 |
| | 2" Premier | 2 |
| | Cellular Shades | 3 |
| | Pleated Shades | 4 |
| | 1" Metal Plus | 5 |
| | 1" Aluminum | 6 |
| | 3 1/2" Grandwood Vertical | 7 |
| | 2. 5" Premier | 8 |
| | | 9 |
| Width | 18"-73" | 18-73 |
| Shading Length | 40"-99" | 40-99 |
| Color | White | 1 |
| | Soft White | 2 |
| | Alabaster | 3 |
| | Golden Oak | 4 |
| | Vanilla | 5 |
| | Henter Green | 6 |
| | Natural | 7 |

FIG. 1

METHOD AND MACHINE FOR CUTTING WINDOW BLIND

BACKGROUND OF THE INVENTION

1. Field of the Invention

The present invention relates to a method and a machine for cutting a window blind and more particularly, to a method and a machine for cutting a window blind, which can automatically set the cutting length by means of reading a barcode provided at the window blind to be cut.

2. Description of the Related Art

Regular window blind manufacturers simply provide limited lengths of blind members, i.e. headrail, bottom rail, slats, shade, for every type of the window blind, such as a horizontal Venetian blind, a vertical Venetian blind, a roller blind, etc. Sale centers such as upholsterers and downstream firms use a blind cutting machine to cut blind members, which are normally slightly greater than the size of a window that is to be installed with the window blind, to a desired length for fitting different sizes of the windows.

Further, regular window blind cutting machines include two types, namely, the saw-cut type, which uses a circular saw to cut blind members, and the die-cut type, which uses a cutter blade to cut blind members. The saw-cut type has the advantages of fast cutting speed and smooth cutting edge. However, using a saw-cut type blind cutting machine to cut blind members produce much dusts, resulting in environmental pollution. Using a die-cut type blind cutting machine to cut blind members does not produce much dust, and can make a particularly designed pattern of edge shape by using a special cutter blade. However, the cutting speed of a die-cut type blind cutting machine is slow. Further, using a cutter blade to cut blind members produces burrs at the cut edge. Therefore, saw-cut type blind cutting machines and die-cut type blind cutting machines have different applications. Users may make a selection subject to the need. There are still different models of saw-cutting blind cutting machines and die-cutting blind cutting machines that provide different functions. For example, there are blind cutting machines that use a hand wheel-operated positioning gage or programmable digitalized positioning gage to set the distance between the rear end of the blind member and the reference line, i.e., to set the size to be cut. There are also known multipurpose blind cutting machines of combination of saw-cutting and die-cutting, and double-sided blind cutting machines with two cutting units at two sides (a regular model of blind cutting machine has only one cutting unit at one side; in order to have the edges of the two distal ends smooth and symmetrical, the other end of the blind member must be reversed and set into the cutting unit for cutting after cutting of one end of the blind member; a double-sided blind cutting machine can cut the two distal ends of the blind member without reversing the position of the blind member).

However, no matter which one of the aforesaid conventional blind cutting machines is used, the operator needs to calculate the cutting length manually, and then to manually control the hand wheel to set the positioning gauge into position or to input the control parameters to set the programmable digitalized positioning gage. Because the cutting length is calculated manually, the risk of human error exists. A miscalculation results in a cutting error, and the product becomes unusable. Further, manual gauge positioning control wastes much time and labor.

SUMMARY OF THE INVENTION

It is the primary objective of the present invention to provide a method and a machine for cutting a window blind by means of reading the barcode provided at the window blind to automatically set the length to be cut, which simplifies the blind member cutting procedure to improve the operation efficiency.

It is another objective of the present invention to provide a method and a machine for cutting a window blind by means of reading the barcode provided at the window blind to automatically set the length to be cut, which eliminates the risk of human calculation error.

It is still another objective of the present invention to provide a method and a machine for cutting a window blind by means of reading the barcode provided at the window blind to automatically set the length to be cut, which enables the cutting data to be stored and edited for setting up a database machine.

To achieve these objectives of the present invention, the method for cutting a window blind by using a cutting machine comprises the step of (a) displaying data of the window blind to be cut on a display by reading a product code provided at the window blind to be cut; (b) inputting the size of a window that is to be installed with the window blind and an installation mode of the window blind by selection, and then calculating and displaying on the display a size to be cut based on the data of the window blind and the size of the window and the installation mode selected; and (c) automatically controlling a positioning mechanism of the cutting machine to move to a predetermined position corresponding to the calculated size to be cut by a processor for stopping the window blind in a cutting position, and then controlling a cutting unit of the cutting machine to cut the window blind by the processor.

BRIEF DESCRIPTION OF THE DRAWINGS

FIG. 1 is a table showing the kind codes and their definitions used in a barcode provided at the window blind to be cut according to the present invention.

DETAILED DESCRIPTION OF THE INVENTION

In a preferred embodiment of the present invention, the member of the window blind to be cut is adhered or marked with a product barcode (not shown). The product barcode contains the data of the product type, width, shading length and color of the blind member to be cut. Generally speaking, the first six numbers of the product barcode are the preposition code of the manufacturer and the last six numbers are the product code for identifying the product on which the barcode is attached. Therefore, the product code, i.e. the last six numbers of the barcode, is used to code the particulars of the blind member to be cut. As shown FIG. 1, the six numbers of the product code can be set as follows: the first number indicates the product type; the second and third numbers indicate the width of the product; the fourth and fifth numbers indicate the shading length of the product; the six (last) number indicates the color of the product. For example, if the product code is read as 518722, it means that the product type is Metal Plus, the product size is 18" wide and 72" long, and the product color is soft white. It is to be understood that the editing mode of numbers of the product barcode may vary subject to the type of applied software, memory space of database, or regulations of definition on product barcode.

Figure 4:
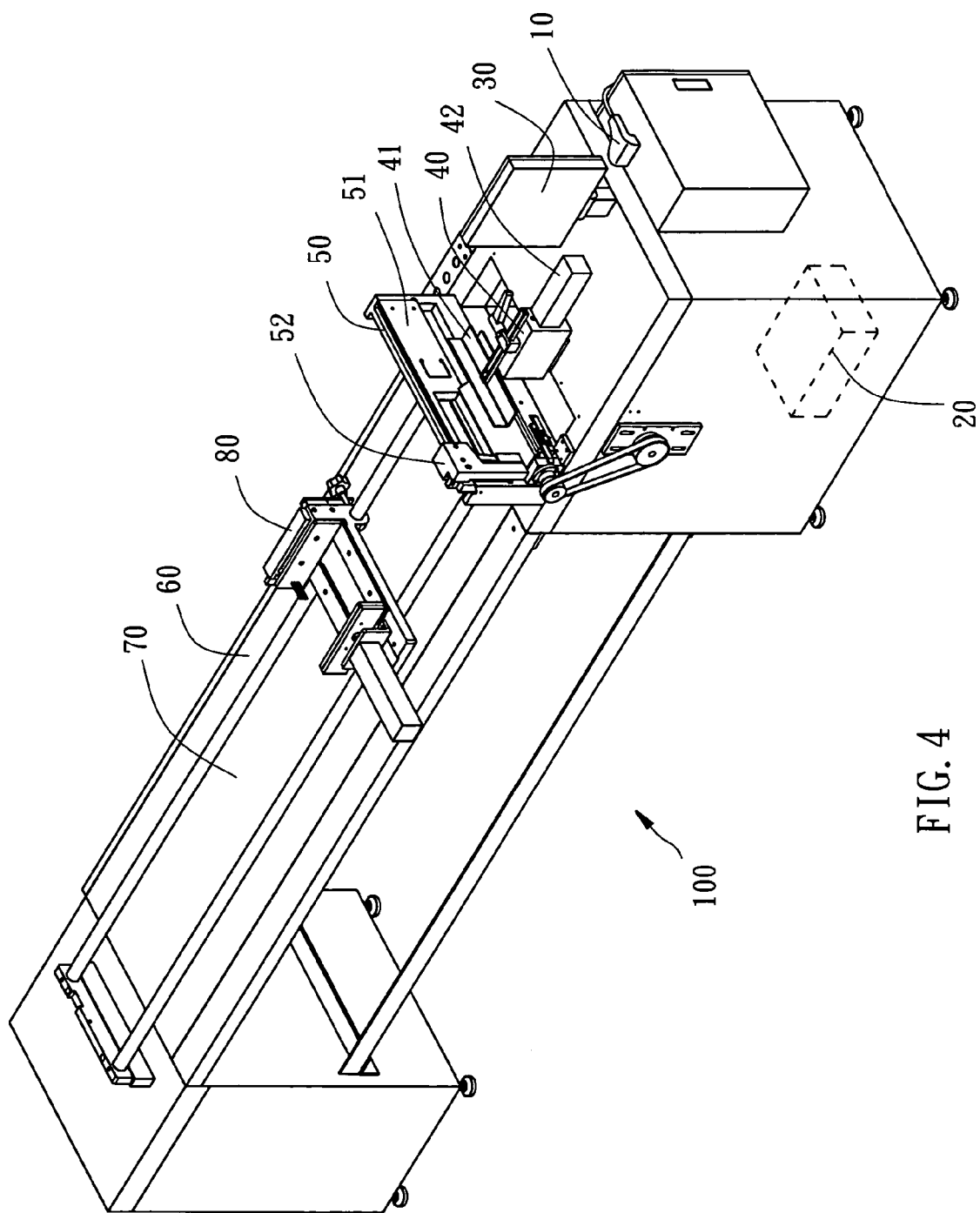
FIG. 4 is a perspective view of a window blind cutting machine constructed according to the present invention.

The window blind cutting machine 100 shown in FIG. 4 is a die-cut type window blind cutting machine that has only one single cutting unit at one side. This design of window blind cutting machine is simply for understanding of the spirit of the present invention. The invention can also be employed to a saw-cut type window blind cutting machine. As illustrated in FIG. 4, the window blind cutting machine 100 comprises a machine base 60, a product holder 70 provided at the top side of the machine base 60, a product carriage 80 movably supported on the product holder 70, a cutting unit 50 provided at the top side of the machine base 60 adjacent to one side of the product holder 70, a positioning mechanism 40, a processor 20, a barcode reader 10, and a display 30. The carriage 80 holds down the workpiece to be cut to further insert the workpiece through the cutting unit 50 for cutting. The cutting unit 50 comprises a mold plate 51 and a cutter 52 movable relative to the mold plate 51. The cutter 52 is driven by a motor through a transmission screw rod to make a linear reciprocating motion over one side of the mold plate 51. The positioning mechanism 40 comprises a positioning gauge 41, and a driver 42 for controlling accurate movement of the positioning gauge 41 (the driver 42 is comprised of a motor and a transmission screw rod). The positioning gauge 41 is used to stop against the distal ends of the inserted parts of the blind members in a flush manner so as to define the distance between the end of each blind member to be cut and the cutting unit 50, i.e., to define the cutting length of each blind member. The processor 20 is electrically respectively connected with the cutting unit 50 and the positioning mechanism 40 for controlling the movements of the cutter 51 and the positioning gauge 41 respectively. The processor 20 also stores the data corresponding to the product barcode in a database thereof, so that the processor 20 can decode the product barcode at the workpiece for further processing. The barcode reader 10 is a photo sensor for reading the product barcode of the workpiece and to send the product barcode to the processor 20 for further processing. The display 30, which is a touch-controlled screen in this embodiment, is electrically connected to the processor 20 for data output.

Figure 2:
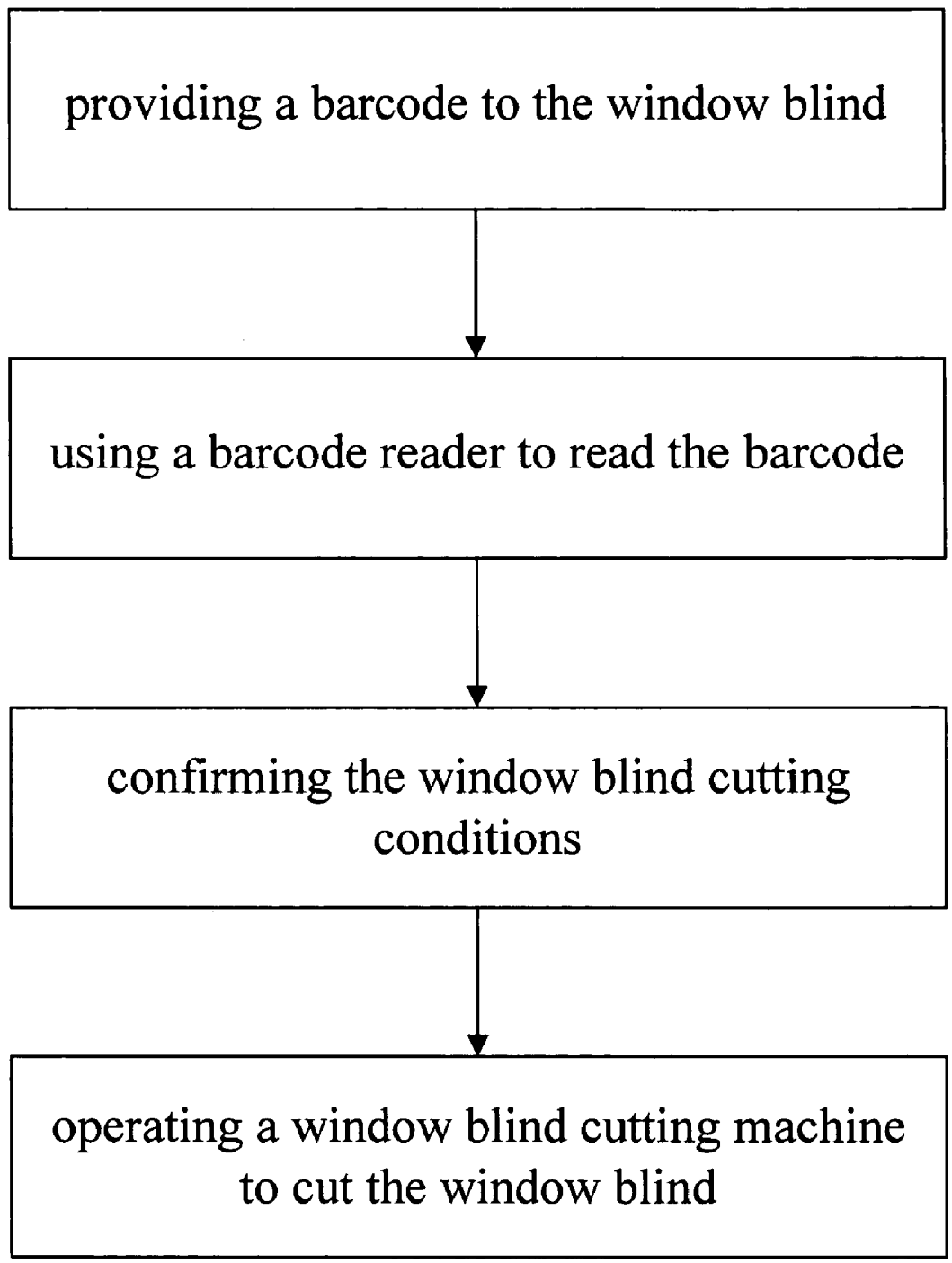
FIG. 2 is a flow chart of the method according to a preferred embodiment of the present invention.
Figure 3:
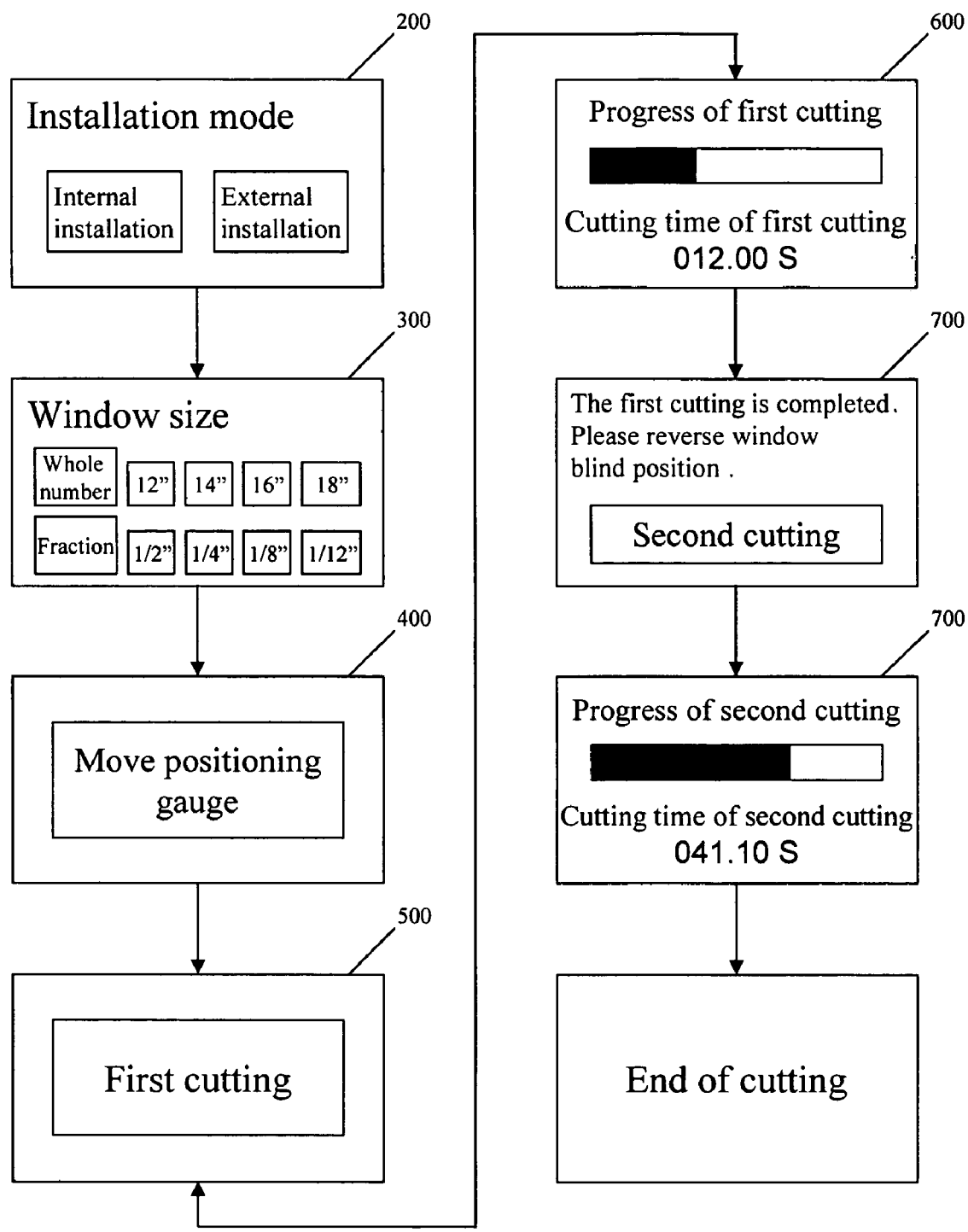
FIG. 3 is a schematic block diagram shown on a touch-controlled screen used in the preferred embodiment of the present invention.

Referring to FIGS. 2 and 3, the method for cutting a window blind, which is capable of automatically setting the cutting length by reading the barcode provided at the blind members, comprises the steps of: (a) providing a barcode to the workpiece, (b) using a barcode reader to read the barcode of the workpiece to be cut, (c) confirming workpiece cutting conditions, and (d) operating a window blind cutting machine to cut the workpiece.

In the first step of providing a barcode to the workpiece (window blind to be cut), a barcode is added to the workpiece by adhesion or any suitable measure before cutting operation. The barcode contains the data of the product type, product width, product shading length, and product color of the workpiece to be cut. For example, if the product code of the barcode is read as 518722, according to the table shown in FIG. 1, it means that the product type is Metal Plus, the product size is 18" wide and 72" long, and the product color is soft white.

In the second step of using a barcode reader to read the barcode of the workpiece to be cut, the barcode of the. workpiece to be cut is read by the barcode reader 10 at the machine base 60 of the window blind cutting machine 100 and transmitted to the processor 20 to decode and to display on the display 30 for viewing and checking by the operator.

After the aforesaid second step, it entered the third step of confirming workpiece cutting conditions. After the display 30 displayed the workpiece data obtained by the barcode reader 10 of the window blind cutting machine 100, use the display 30, i.e. the touch-controlled screen, to select the installation mode (internal mounting or external mounting) by touching the block indicated by reference numeral 200 in FIG. 3 and to further select the window size by touch the block indicated by reference numeral 300 in FIG. 3, for enabling the processor 20 to compare and calculate the data. If internal mounting is selected, the processor 20 calculates the size to be cut subject to an internal mounting equation so that the width of the workpiece (window blind) after cutting becomes shorter than the width of the window. If external mounting is selected, the processor 20 calculates the size to be cut subject to an external mounting equation so that the width of the workpiece (window blind) after cutting is maintained greater than the width of the window. For example, if internal mounting is selected, the width of the workpiece to be cut is read as 18", and the inputted window size is 16", the size to be cut at one end is 1+A inches, i.e. [(18−16)/2]+A, in which A represents a distance to be left between the border of the window and an end of the workpiece (window blind). Because the two ends of the workpiece must be equally cut, therefore the balance resulted from (18−16) must be divided by 2 so as to obtain the size to be cut at one end of the workpiece.

If external mounting is selected, the width of the workpiece to be cut is read as 18", and the inputted window size is 16", the size to be cut at one end is 1−A inches, i.e. [(18−16)/2]−A, in which A represents a extending distance from a border of the window to an end of the workpiece (normally A=¼"). Because the two ends of the workpiece must be equally cut, therefore the balance resulted from (18−16) must be divided by 2 b so as to obtain the size to be cut at one end of the workpiece.

After calculation of the size to be cut at one end by the processor 20 and display of the calculated data on the display 30, it enters the fourth step of operating the window blind cutting machine to cut the workpiece. At this time, the processor 20 automatically sets the position of the positioning gauge 41 of the positioning mechanism 40 after the operator touched the block indicated by reference numeral 400 in FIG. 3, making the distance between the end of the positioning gauge 41 and the cutting side of the mold plate 51 to be equal to the calculated size to be cut, i.e., the distance between the end of the workpiece, which is inserted through the mold plate 51 and stopped at the positioning gauge 41, and the cutting side of the mold plate 51 to be equal to the calculated size to be cut, and then the processor 20 controls the cutter 51 of the cutting unit 50 of the window blind cutting machine 100 to cut off the unnecessary part from one end of the workpiece after the operator confirmed and touched the block indicated by reference numeral 500 in FIG. 3. In the meantime, the cutting progress will be shown on the display 30 in the block indicated by reference numeral 600 in FIG. 3. Because the window blind cutting machine 100 is equipped with only one cutting unit, each cutting procedure cuts off one half of the total size to be cut. After cutting of one end of the workpiece, the workpiece is reversed, and then the window blind cutting machine 100 is controlled to cut off the unnecessary part from the other end of the workpiece after the operator confirmed the cutting condition and touched the block indicated by reference numeral 700 in FIG. 3 and the display 30 is simultaneously driven to show the cutting progress of the second cutting procedure in the block indicated by reference numeral 800 in FIG. 3. After the second cutting procedure, the size of the workpiece (window blind) fits the size of the window perfectly.

The method for cutting a window blind by using a window blind cutting machine, which is capable of automatically setting the cutting length by reading the barcode provided at the blind members to be cut, has been fully described above. According to the method of the present invention, the product data is directly inputted into the window blind cutting machine by means of the operation of the barcode reader 10 to read the barcode of the window blind, and the processor 20 directly calculates the size to be cut based on the inputted product data, preventing a miscalculation due to a human error. The built-in database and software of the processor 20 can gather window blind cutting data and establish files of cutting records for inventory and client control. The window blind cutting data includes every serial record such as the cutting date, the number of cuttings, the product code, the operator's identification code, the quantity of window blinds that have been cut subject to a specific product code, the quantity of window blinds that have been cut subject to a specific window specification and installation mode. For example, before each cutting operation, the operation is required to input his (her) identification code, and the operator is allowed to start the cutting operation only after inputted identification code has been recognized. This measure greatly ensures the safeness of the window blind cutting machine, and helps the company establish a responsibility system. Gathering the data of window size and installation mode is very helpful to investigation on window specification and installation favorite for manufacturer's reference in further window blind fabrication. By means of the establishment of the aforesaid cutting data, the wearing status of the cutting unit 50 (cutter 51) is well controlled, and replacement of the cutter can be done in time.

In a word, after start of the second step, the display 30 starts to show different selections (such as input operator's identification code; select installation mode, window's width, number of times the cutter performed, etc.) and the progress of the procedure under going. However, the display of these selections and their order are preset in the processor 20 (subject to the design of the software). Modifications may be made to fit different requirements.

Further, instead of the use of the barcode reader 10 to read the product data from the window blind to be cut, a keyboard (not shown) may be used to input the barcode of the product into the processor for processing. The keyboard may be used as a supplementary data input device for use upon failure of the barcode reader 10.

Figure 5:
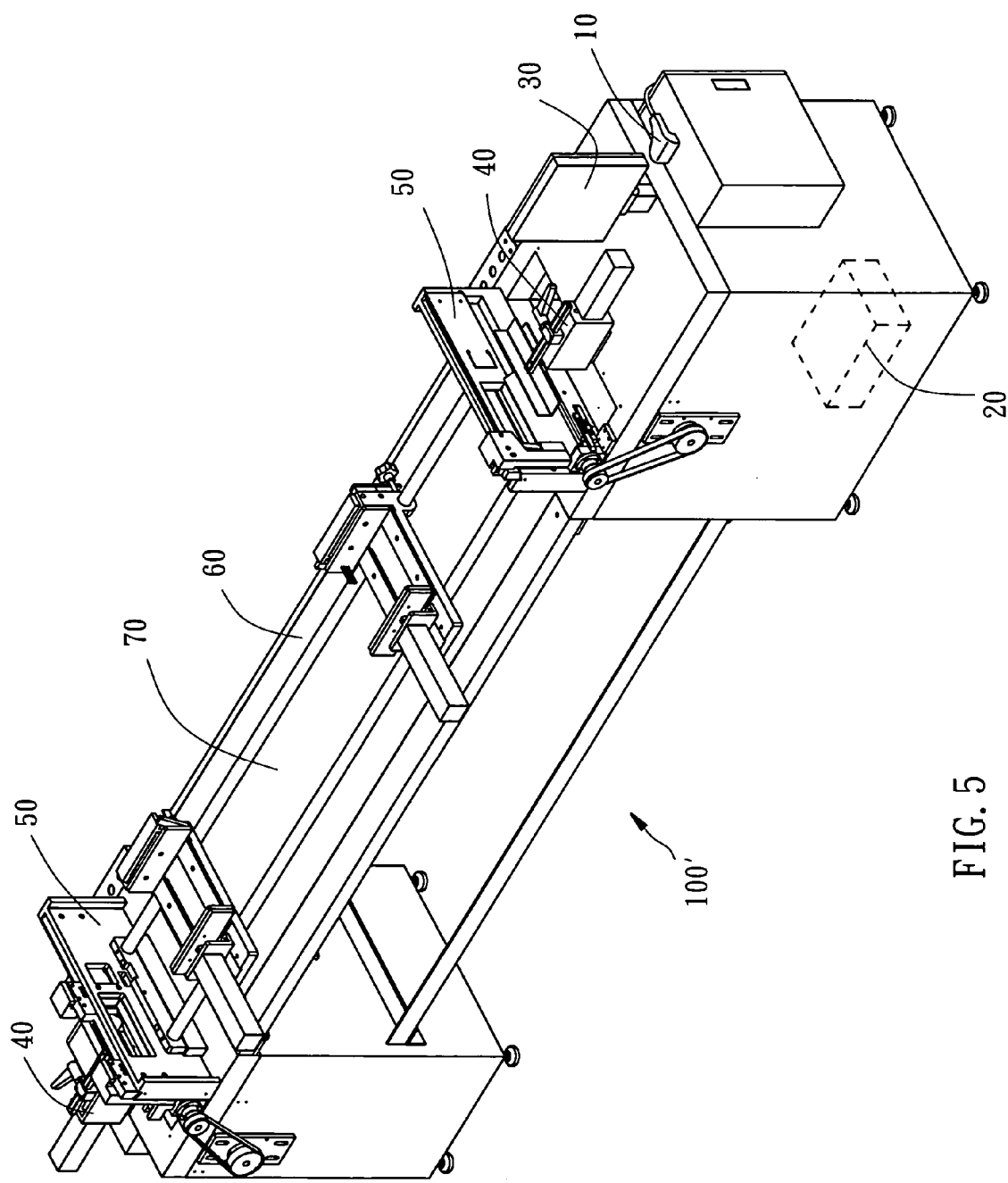
FIG. 5 is a perspective view of an alternate form of the window blind cutting machine constructed according to the present invention.

FIG. 5 shows an alternate form of the window blind cutting machine according to the present invention. According to this embodiment, the window blind cutting machine 100' has each of the two sides respectively provided with a cutting unit 50 and a positioning mechanism 40. During operation, the product carriage 80 carries the workpiece to one side of the window blind cutting machine 100', for enabling one end of the workpiece to be cut by the corresponding cutting unit, and then the product carriage 80 moves the workpiece to the other side of the window blind cutting machine 100' for enabling the other end of the workpiece to be cut by the other cutting unit.

What is claimed is:

1. A method for cutting a window blind, the method comprising the steps of:
   a) reading a product code provided at the window blind and then obtaining data of the window blind corresponding to the product code by a processor;
   b) selecting an installation mode of the window blind and the window size of a window that is to be installed with the window blind for enabling said processor to calculate a size to be cut based on the data of the window blind and the installation mode and the window size selected; and
   c) controlling a positioning mechanism of a window blind cutting machine to move to a predetermined position corresponding to the size to be cut calculated by said processor for stopping the window blind in a cutting position, and then cutting the window blind by a cutting unit of said window blind cutting machine.

2. The method as claimed in claim 1, wherein said product code contains a code of a width of the window blind.

3. The method as claimed in claim 1, wherein said processor comprises a database containing data of window blinds for decoding the product code provided at the window blind to the data of the window blind.

4. The method as claimed in claim 3, wherein the data of the window blinds contained in said processor includes widths, lengths, colors, and product types of the window blinds.

5. The method as claimed in claim 1, wherein the product code is read by a code reader in the step (a).

6. The method as claimed in claim 1, wherein a keyboard is used to achieve the reading of the product code in the step (a).

7. The method as claimed in claim 1, wherein in the step (b) the installation mode of the window blind is selected from the group consisting of an internal installation mode and an external installation mode.

8. The method as claimed in claim 7, wherein the size to be cut is calculated by said processor to have a width of the window blind after cutting be shorter than that of the window when said internal installation mode is selected.

9. The method as claimed in claim 7, wherein the size to be cut is calculated by said processor to have a width of the window blind after cutting be greater than that of the window when said external installation mode is selected.

10. The method as claimed in claim 1, wherein a touch-controlled screen is used to display the data of the window blind in the step (a).

11. The method as claimed in claim 1, wherein the installation mode and the window size are selected by means of using a touch-controlled screen in the step (b).

12. The method as claimed in claim 1, wherein a first end of the window blind is cut off the size to be cut calculated by said processor, and then a second end of the window blind is cut off the size to be cut calculated by said processor in the step (c).

13. The method as claimed in claim 1, wherein said processor stores cutting data after cutting so that the user can fetch the data when desired.

14. The method as claimed in claim 13, wherein said cutting data includes serial records containing cutting dates, product codes, identification codes of operators, quantity of window blinds that have been cut subject to a specific product code, and quantity of window blinds that have been cut subject to a specific window specification and installation mode.

15. The method as claimed in claim 1, further including a step of adding the product code, which is readable by the processor, to the window blind before the step (a).

16. The method as claimed in claim 1, wherein said positioning mechanism of said window blind cutting machine is controlled by said processor to automatically move to the predetermined position in the step (c).

17. The method as claimed in claim 1, wherein said cutting unit of said window blind cutting machine is controlled by said processor to automatically move to cut the window blind in the step (c).

18. A method for cutting a window blind, the method comprising the steps of:
   a) obtaining a width data of the window blind to be cut;
   b) inputting a window blind installation condition into a processor for enabling said processor to calculate a size to be cut based on the width data of the window blind and the window blind installation condition; and
   c) controlling a positioning mechanism of a window blind cutting machine to move to a predetermined position corresponding to the size to be cut calculated by said processor for stopping the window blind in a cutting position, and then cutting the window blind by a cutting unit of said window blind cutting machine.

19. The method as claimed in claim 18, wherein the width data of the window blind is obtained by means of using a code reader to read a product code provided at the window blind in the step (a).

20. The method as claimed in claim 18, wherein a keyboard is used to obtain the width data of the window blind in the step (a).

21. The method as claimed in claim 18, wherein said installation condition includes the size of a window that is to be installed with the window blind and an installation mode of the window blind in the step (b).

22. The method as claimed in claim 21, wherein the installation mode of the window blind is selected from the group consisting of an internal installation mode and an external installation mode.

23. The method as claimed in claim 22, wherein the size to be cut is calculated by said processor to have a width of the window blind after cutting be shorter than that of the window when said internal installation mode is selected.

24. The method as claimed in claim 22, wherein the size to be cut is calculated by said processor to have a width of the window blind after cutting be greater than that of the window when said external installation mode is selected.

25. The method as claimed in claim 18, wherein said positioning mechanism of said window blind cutting machine is controlled by said processor to automatically move to the predetermined position in the step (c).

26. The method as claimed in claim 18, wherein said cutting unit of said window blind cutting machine is controlled by said processor to automatically move to cut the window blind in the step (c).

27. A method for cutting a window blind, which is capable of automatically setting a length to be cut by means of reading a product code provided at the window blind, the method comprising the steps of:
   a) reading the product code provided at the window blind and displaying data of the window blind corresponding to the product code on a display;
   b) inputting a window blind installation condition by selection, and then calculating and displaying on the display a size to be cut based on the data of the window blind and the window blind installation condition selected; and
   c) automatically controlling a positioning mechanism of a window blind cutting machine to move to a predetermined position corresponding to the calculated size to be cut by a processor for stopping the window blind in a cutting position, and then controlling a cutting unit of said window blind cutting machine to move to cut the window blind by the processor; and
   wherein in the step (b) said installation condition includes the size of a window that is to be installed with the window blind and an installation mode of the window blind.

28. The method as claimed in claim 27, wherein the product code is read by a code reader and the data of the window blind is a width data of the window blind in the step (a).

29. The method as claimed in claim 27, wherein a keyboard is used to achieve the reading of the product code and the data of the window blind is a width data of the window blind in the step (a).

30. The method as claimed in claim 27, wherein the installation mode of the window blind is selected from the group consisting of an internal installation mode and an external installation mode.

31. The method as claimed in claim 30, wherein the size to be cut is calculated by said processor to have a width of the window blind after cutting be shorter than that of the window when said internal installation mode is selected.

32. The method as claimed in claim 30, wherein the size to be cut is calculated by said processor to have a width of the window blind after cutting be greater than that of the window when said external installation mode is selected.

* * * * *